(No Model.)
L. & T. SOSEMAN.
HAY STACKER.
No. 339,818. Patented Apr. 13, 1886.
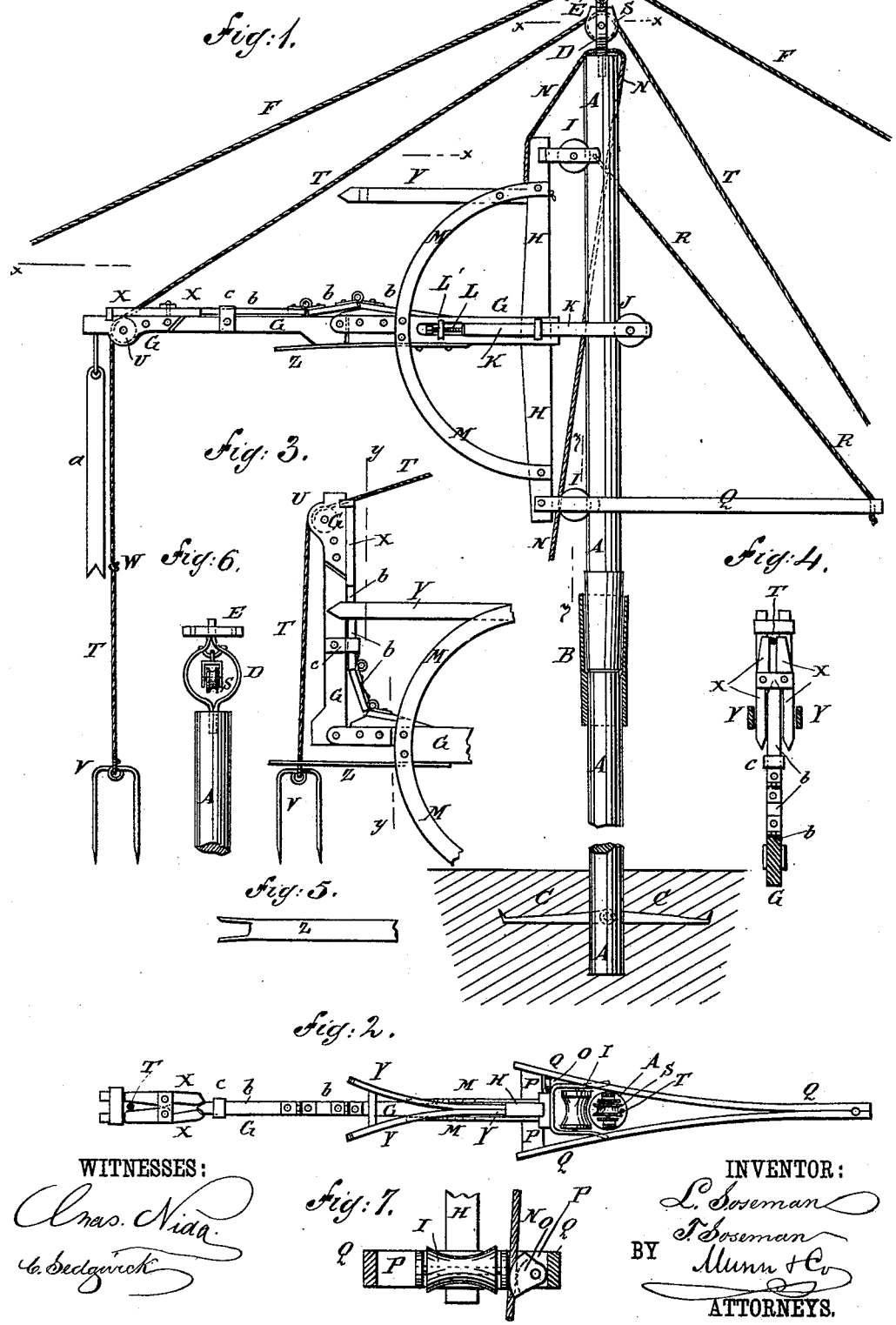
WITNESSES:
Chas. Nida
C. Sedgwick
INVENTOR:
L. Soseman
T. Soseman
BY Munn & Co.
ATTORNEYS.

UNITED STATES PATENT OFFICE.

LABAN SOSEMAN AND THOMAS SOSEMAN, OF SOUTH BEND, INDIANA.

HAY-STACKER.

SPECIFICATION forming part of Letters Patent No. 339,818, dated April 13, 1886.

Application filed January 26, 1886. Serial No. 189,874. (No model.)

*To all whom it may concern:*

Be it known that we, LABAN SOSEMAN and THOMAS SOSEMAN, both of South Bend, in the county of St. Joseph and State of Indiana, have invented a new and useful Improvement in Hay-Stackers, of which the following is a full, clear, and exact description.

Reference is to be had to the accompanying drawings, forming a part of this specification, in which similar letters of reference indicate corresponding parts in all the figures.

Figure 1 is a side elevation of our improved hay-stacker, partly in section and parts being broken away. Fig. 2 is a sectional plan view of the same, taken through the line $x\ x\ x\ x$, Fig. 1. Fig. 3 is a side elevation of a part of the same, showing the jointed derrick-arm in a raised position. Fig. 4 is a sectional elevation of the part of the stacker shown in Fig. 3, taken through the line $y\ y$ in the said figure. Fig. 5 is a plan view of a part of the holding-bar. Fig. 6 is a front elevation of the upper end of the pole and its attachments. Fig. 7 is a sectional elevation of a part of the stacker, taken on the line $z\ z$, Fig. 1.

The object of this invention is to improve the construction of the hay-stacker for which Letters Patent No. 249,413 were issued to us November 8, 1881, in such a manner as to make them more convenient and effective in use and more reliable in operation.

The invention consists in the construction and combination of various parts of the hay-stacker, as will be hereinafter fully described.

A represents the pole, which may be of any desired length, and which is preferably made in two or more parts, secured to each other at their adjacent ends by ferrules B, into the opposite ends of which the said adjacent ends are inserted, as illustrated in Fig. 1. The lower end of the pole A is slotted, and to the said pole, at the upper end of the said slot, are pivoted the inner ends of two prongs, C, the lower ends of which are inclined outward, as shown in Fig. 1, so that when the said lower end of the pole is pushed down into a heap of hay or straw the outwardly inclined ends of the said prongs will engage with the hay or straw, and the said prongs will be forced into a horizontal position, so that the pole A, at the upper end of its slot, will rest upon the said prongs, and the said pole will be kept from being forced too far into the hay or straw.

In a socket in the upper end of the pole A works a pivot formed upon the lower end of a small frame, D, which has a pivot upon its upper end to receive the block or plate E.

To the block E are attached the upper ends of the guy-ropes F, the lower ends of which are staked to the ground in the ordinary manner, so that the pole A will be held securely in an erect position while the frame D will be free to turn.

G is the derrick-arm, which is made in two parts, hinged to each other at the upper edges of their adjacent ends, so that the outer part of the said arm will be free to swing upward, but cannot swing downward below a horizontal position.

To the inner end of the arm G is attached the middle part of a vertical cross-bar, H, to the ends of which are connected by suitable supports concaved rollers I, to rest against and roll along the side of the pole A.

Against the opposite side of the pole A, about midway between the rollers I, rests a third concaved roller, J, which is pivoted to and between the ends of a U-shaped supporting-bar, K. The bend of the U-shaped bar K passes through a slot in the inner part of the arm G, and has a screw, L, swiveled to it. The screw L passes through a nut, L', secured to the arm G within its slot, so that by turning the swiveled screw L the rollers I J can be adjusted to the pole A, and made to clamp the pole with any desired force.

To the derrick-arm G, a little in the rear of its joint, are attached the middle parts of the curved braces M, the ends of which are attached to the end parts of the vertical cross-bar H, to strengthen the said derrick-arm in position.

To the upper end of the vertical cross-bar H is attached the end of a rope, N, which passes through the frame D and extends down along the pole A into such a position that it can be conveniently reached and operated by the stack-builder, to raise and lower the derrick-arm G, as may be required. When the derrick-arm G has been adjusted, the adjusting-rope N is secured and the said derrick-arm is supported by the cam or eccentric O, pivoted to a short cross-bar, P, attached to the lower end of the vertical cross-bar H, and by which the said rope is clamped against the support for the lower roller I, or other suitable support, so that the said derrick-arm G and its attachments can be swung around the pole A without twisting the rope N or winding it around the said pole A.

To the ends of the short cross-bar P are hinged or otherwise secured the forked end of the arm Q, through the fork of which the pole A passes, and which is connected at its outer end with the upper end of the vertical cross-bar H, or the support for the upper roller I, and is supported in a horizontal position by a rope, R. The forked arm Q serves as a lever for swinging the derrick-arm G and its attachments around the pole A, to bring the loaded fork directly over the part of the stack where the fork-load is to be deposited.

To and within the small pivoted frame D is loosely hung the block of the pulley S, over which the hoisting-rope T passes, so that the said pulley can adjust itself to the varying direction of the said rope. From the pulley S one end of the rope T is led to the place where the power is applied. The other part of the rope T passes over a pulley, U, pivoted to bearings attached to the opposite sides of and projecting beyond the outer end of the derrick-arm G. The end of the rope T is provided with an ordinary hay-fork, V, to engage with and raise the hay or straw to be stacked.

Upon the rope T, at a little distance from the fork V, is formed or to it is attached a knot, ball, or button, W, which, when the loaded fork has been raised to the required height, passes over the pulley U and comes in contact with the lower side of the forward ends of two bars, x, between which the said hoisting-rope T passes, and by which the said rope is prevented from passing any farther over the pulley U, and is made to raise the forward part of the derrick-arm G into a vertical position, bringing the loaded fork nearer the center of the stack and allowing the fork-load to be deposited at any desired part of the stack by swinging the derrick-arm G around the pole A. As the outer part of the derrick-arm comes into a vertical position, it is received in the forked outer end of the horizontal arm Y, the inner end of which is rigidly attached to the upper parts of the braces M and vertical cross-bar H, so as to hold the said part of the derrick-arm G securely in place while being swung around the pole A, and prevent the hinge of the said derrick-arm from being strained or broken. As the outer part of the derrick-arm G comes into a vertical position, the part of the hoisting-rope T, just above the loaded fork V, enters the forked outer end of the bar Z, to hold the said loaded fork from swinging about when the the derrick-arm G is being swung around the pole A. The inner end of the forked bar Z is attached to the lower side of the inner part of the derrick-arm G. If desired, the upward movement of the hoisting-rope T, over the pulley U, can be stopped by a bar, a, hung at its upper end from the outer ends of the bearings for the said pulley, U, and the forked lower end of which engages with the said loaded fork, stops its upward movement and causes the hoisting-rope to raise the outer part of the derrick-arm into a vertical position. The rear ends of the pivoted bars X are beveled upon their inner sides, so as to receive the beveled forward end of the bar b, which slides in a keeper, c, attached to the said forward part of the derrick-arm G. The sliding bar b is made in three parts, connected by hinges, and the rear end of the said bar is secured to the upper side of the inner part of the derrick-arm G, so that the said bar will not interfere with the movement of the derrick-arm upon its hinge. With this construction as the forward part of the derrick-arm G is raised toward a vertical position, the bar b slides forward between the rear ends of the pivoted bars X, and causes the forward parts of the said bars to clamp the hoisting-rope T, to further guard the said rope from being drawn farther through the said bars, and to allow the forward part of the said derrick-arm to be drawn down into a horizontal position by pulling upon the trip-rope. As the forward part of the derrick-arm G comes into a horizontal position, the bar b is withdrawn from the pivoted bars X, and the fork is allowed to descend to be again loaded.

Having thus fully described our invention, we claim as new and desire to secure by Letters Patent—

1. In a hay-stacker, the derrick-arm G, composed of two sections, the inner section being rigidly secured to a support and the outer one hinged to the inner one by a hinge at the upper side of the adjacent ends of the said stations, substantially as shown and described, whereby the outer section can be swung up into a vertical position to bring the loaded fork nearer to the pole and the downward movement of said section, beyond a horizontal position, limited, as set forth.

2. In a hay-stacker, the combination, with the jointed derrick-arm G, of the pivoted clamping-bars X, having beveled rear ends, and the jointed sliding bar b, having beveled forward end, and its keeper c, substantially as herein shown and described, whereby the rise of the outer part of the said derrick-arm will cause the said pivoted bars to clamp the hoisting-rope and allow the derrick-arm to be drawn back to a horizontal position by means of the trip-rope, as set forth.

3. In a hay-stacker, the combination, with the pole A and the derrick-arm G, of the vertical cross-bar H, the concaved rollers I J, arranged on the opposite sides of the said pole, the roller-supports, and the adjusting-rope N, substantially as herein shown and described, whereby the said derrick-arm can be swung around the said pole and moved up and down upon it, as set forth.

4. In a hay-stacker, the combination, with the derrick-arm G and the support K, for the center roller, J, of the swiveled screw L and its stationary nut L', substantially as herein shown and described, whereby the said center roller can be readily adjusted to the pole, as set forth.

5. In a hay-stacker, the combination, with the vertical cross-bar H of the derrick-arm, of the lever Q and rope R, substantially as herein shown and described, whereby the said derrick-arm can be readily swung around the pole, as set forth.

6. In a hay-stacker, the combination, with the cross-bar H of the derrick-arm and the braces M, of the forked arm Y, substantially as herein shown and described, whereby the outer part of the derrick-arm, when raised, will be stopped in a vertical position and will be held from lateral movement, as set forth.

7. In a hay-stacker, the combination, with the inner part of the jointed derrick-arm, of the projecting forked bar Z, substantially as herein shown and described, to receive the hoisting-rope when the outer part of the said derrick-arm is raised and hold the loaded fork from swinging as the derrick-arm is swung around the pole, as set forth.

LABAN SOSEMAN.
THOMAS SOSEMAN.

Witnesses:
　GEO. W. MATTHEWS,
　A. E. PICKARD.